Oct. 19, 1965   H. T. SAMPSON   3,212,256
CASE BONDING SYSTEM FOR CAST COMPOSITE PROPELLANTS
Filed Oct. 24, 1961

*INVENTOR.*
HENRY T. SAMPSON
BY
*C. H. Firsht*
ATTORNEY.

3,212,256
CASE BONDING SYSTEM FOR CAST COMPOSITE PROPELLANTS

Henry T. Sampson, China Lake, Calif., assignor to the United States of America as represented by the Secretary of the Navy
Filed Oct. 24, 1961, Ser. No. 147,376
3 Claims. (Cl. 60—35.6)
(Granted under Title 35, U.S. Code (1952), sec. 266)

The invention herein described may be manufactured and used by or for the government of the United States of America for governmental purposes without the payment of any royalties thereon or therefor.

The present invention relates to a method of bonding an object within a container, and more particularly to a method for bonding a cast composite rocket propellant to the motor case.

A rocket motor commonly comprises a metal combustion chamber or casing having an exhaust nozzle, a liner, an propellant grain contained within the chamber. The common methods for supporting the propellant grain within the combustion chamber is to bond the grain in place as will be explained, or by supporting the grain in the chamber or case by means of springs or other mechanical means. Bonding has several advantages over the mechanical support. First, the grain is uniformly supported at all points and is therefore less subject to high localized loads and makes the motor and grain better able to withstand greater stresses such as those due to acceleration, dropping, vibration and burning stresses. Also, such bonding gives better protection against burning along the grain sides. However, all grains are not capable of being bonded by present methods. The present invention satisfies a need for successfully bonding cast composite grains to a rocket motor, with the economic advantage of being able to cast the propellant grain several days after the surface to which the propellant is to be bonded has been coated with methyl α-cyanoacrylate monomer containing sulfur dioxide.

It is an object of the present invention to provide a case bonding system by which a propellant grain may be bonded inside a rocket motor casing in a reliable manner.

Another object is to provide a case bonding method which will permit the inside of the motor chamber to be coated with a surface preparation material for several days before the propellant is cast in the motor.

A further object of the present invention is to provide a method for bonding propellant grains to the rocket motor casing which has the economic advantages of reduced time, equipment, and labor.

Still another object of this invention is to provide a bonding system which in addition to its adhesive quality also acts as an effective burn inhibitor for composite propellant grains.

Yet another object of this invention is to provide an improved rocket motor having a composite propellant grain firmly secured to the liner thereof.

The objects are accomplished by bonding the grain integrally to the rocket motor chamber or casing by utilizing a surface preparation material which is compatible with composite propellant grain compositions. The material used in this invention comprises methyl α-cyanoacrylate monomer and sulfur dioxide.

The invention can best be understood by reference to to the drawing in which.

Figure 1:
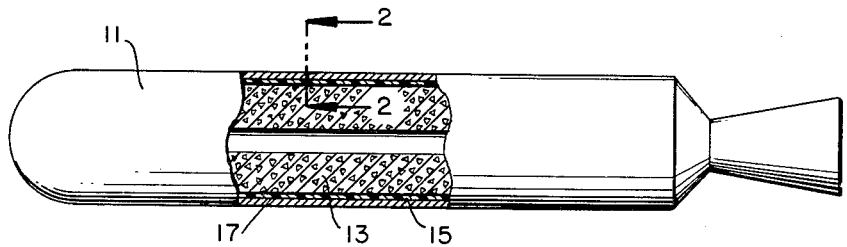
FIGURE 1 is a side elevation of a rocket motor, partly in section.
Figure 2:
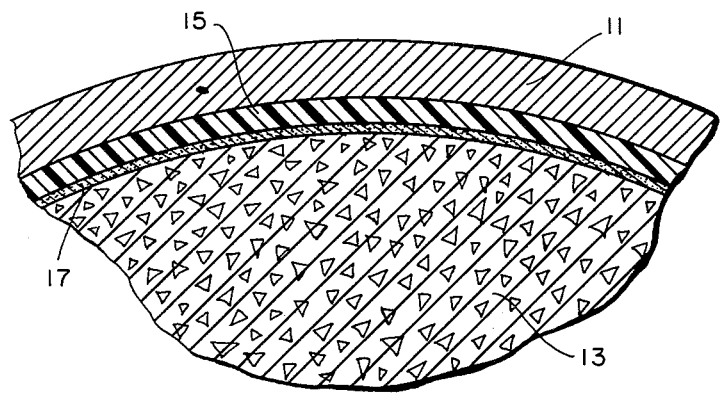
FIG. 2 is an enlarged section taken on line 2—2 of FIG. 1.

Referring now to the drawing, wherein like reference characters designate like or corresponding parts, there is shown in FIG. 1 a rocket motor tube or casing 11 containing a solid composite propellant grain 13, both of which are of conventional construction. Tube or casing 11 has cast inside thereof a liner 15 which covers the inner surface part of the motor casing surrounding the propellant grain. Grain 13 is bonded to liner 15 by a surface preparation material 17, hereinafter described, whereby the grain is sealed or bonded to the liner and thereby to the rocket tube.

A common method of filling the combustion chamber with solid propellant grain is by mixing the solid ingredients and liquid binder at an elevated temperature and pouring or casting it into place and then curing for several days. The type propellant for which the present bonding system was designed is the cast composite propellant. These propellants comprise an oxidant such as ammonium nitrate, ammonium perchlorate, and potassium perchlorate held together by a binder which is also, generally, a fuel. These binder materials can be asphaltic or other thermoplastic materials or they can be a rubber or other polymer which achieves its strength as a result of vulcanization or other types of curing. One propellant composition which was bonded successfully for the first time by use of the methyl α-cyanoacrylate composition of this invention is the Nitrasol propellant described in co-pending application Serial No. 761,448, filed September 16, 1958.

The method used in the bonding system of the present invention comprises coating, by spraying, brushing, or the like, the liner of the rocket motor chamber or casing with a layer of surface preparation material consisting essentially of about 100% by weight methyl α-cyanoacrylate containing from 60 to 90 parts per million sulfur dioxide. The rocket liner comprises polyurethane rubber, other rubbers, or thermoplastic material which is cast in the motor and covers the entire surface of that part of the motor casing which includes the propellant grain. The propellant is poured or cast and finally cured for a predetermined period of time.

One of the unique properties of the surface preparation material of this invention, namely methyl α-cyanoacrylate containing sulfur dioxide, is that it will bond the propellant to the rocket liner when the methyl α-cyanoacrylate composition is in either the polymerized or unpolymerized conditions. Furthermore, this method will also allow the surface to be bonded to the propellant to be coated with the methyl α-cyanoacrylate composition from about 2 to 7 days before the propellant is cast without loss of adhesive power.

The composition herein disclosed comprising approximately 100% by weight methyl α-cyanoacrylate containing 60 to 90 parts per million sulfur dioxide appears to form a chemical bridge (hydrogen bonding) between the liner material and the propellant composition, thereby creating a permanent bond. Since the CN groups of the methyl α-cyanoacrylate monomer and the hydrogen attached to the OH groups of the composite propellant compositions and liner materials have strong tendencies to interact, it is believed this could be the reason for the strong bonds between the materials.

The small amount of sulfur dioxide contained in the methyl α-cyanoacrylate monomer prevents the loss of activity of the monomer prior to use. In other words, it may well act as a stabilizer.

Thus this invention provides a bonding system which in its broadest sense encompasses a composite propellant grain securely adhered to the liner of a rocket motor. Obviously many modifications and variations of the present invention are possible in the light of the above

What is claimed is:
1. In a rocket motor, in combination, a metal casing, a liner secured to the inside of the casing, a solid propellant grain positioned in a bonding relation to said liner, said grain consisting essentially of a composite propellant composition comprising an inorganic oxidizer and a fuel binder; said liner consisting essentially of a urethane rubber, and a layer of surface preparation material between the liner and the grain and bonded to each other for securing the grain in the casing, said material comprising about 100% methyl α-cyanoacrylate containing 60 to 90 parts per million sulfur dioxide.

2. In a rocket motor comprising a metal casing, a thermoplastic liner positioned in a bonding relation to the inside of the casing and a solid nitrasol propellant grain; the improvement which comprises a layer of a surface preparation material, consisting essentially of methyl α-cyanoacrylate containing sulfur dioxide, between the grain and the liner and bonded to each whereby the grain is secured to the casing.

3. In a rocket motor comprising
a metal tube containing a composite propellant grain comprising an inorganic oxidizer and a thermoplastic binder, and a thermoplastic liner cast within said tube covering the surface of that part of the tube which includes the grain;
the improvement which consists of a layer of surface preparation material between the liner and the grain wherein the grain is bonded to the liner and thereby to the tube;
said layer consisting essentially of about 100% methyl α-cyanoacrylate containing from 60 to 90 parts per million sulfur dioxide.

References Cited by the Examiner

UNITED STATES PATENTS

| | | | |
|---|---|---|---|
| 2,957,309 | 7/57 | Kobbeman | 60—35.6 |
| 2,877,504 | 3/59 | Fox | 18—59 |
| 2,978,377 | 4/61 | Hall et al. | 102—98 X |
| 3,027,597 | 4/62 | McCurdy | 18—26 X |
| 3,031,969 | 5/62 | Collard et al. | 102—98 |
| 3,032,975 | 5/62 | Alden | 60—35.6 |
| 3,048,112 | 8/62 | Shope | 102—98 |

MARK NEWMAN, *Primary Examiner.*

LEON D. ROSDOL, BENJAMIN A. BORCHELT, *Examiners.*